(Model.)
G. HAYES.
METALLIC LATHING.
No. 521,498. Patented June 19, 1894.
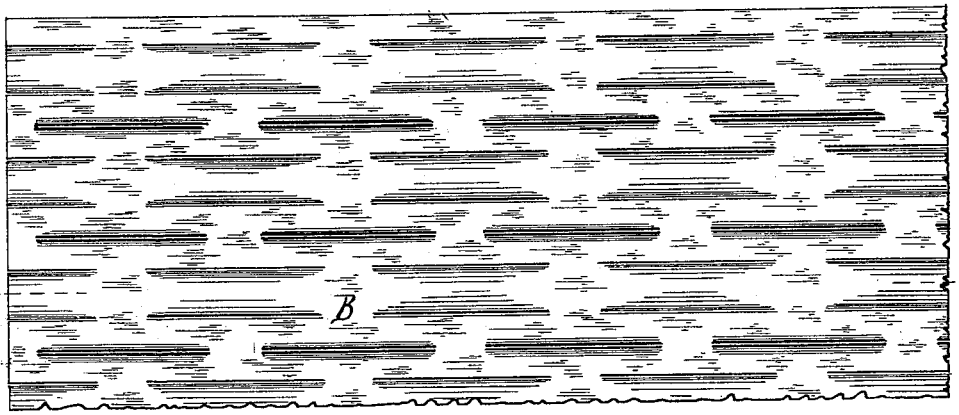
Fig. 1.
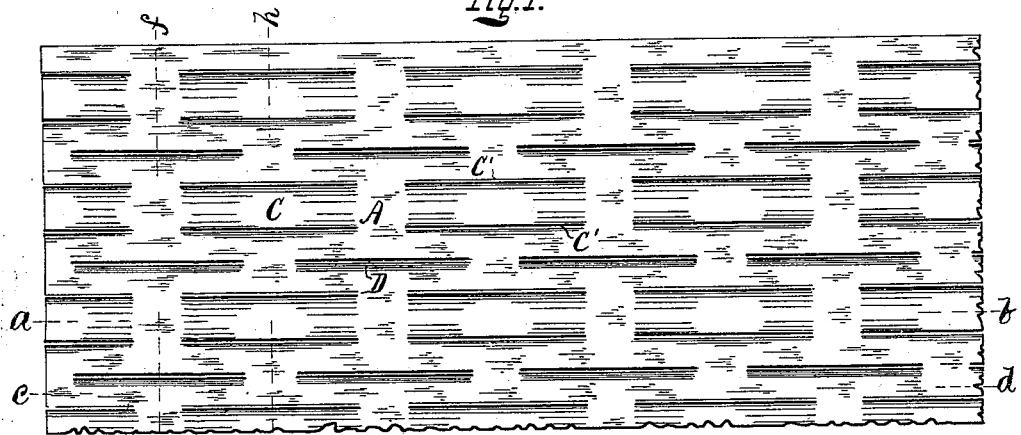
Fig. 2.
Fig. 3. a-b
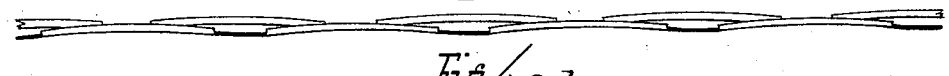
Fig. 4. c-d
Fig. 5. e-f    Fig. 6. g-h.
Witnesses:
Arthur Hayes
Frank. Halle.
Inventor:
Geo Hayes.

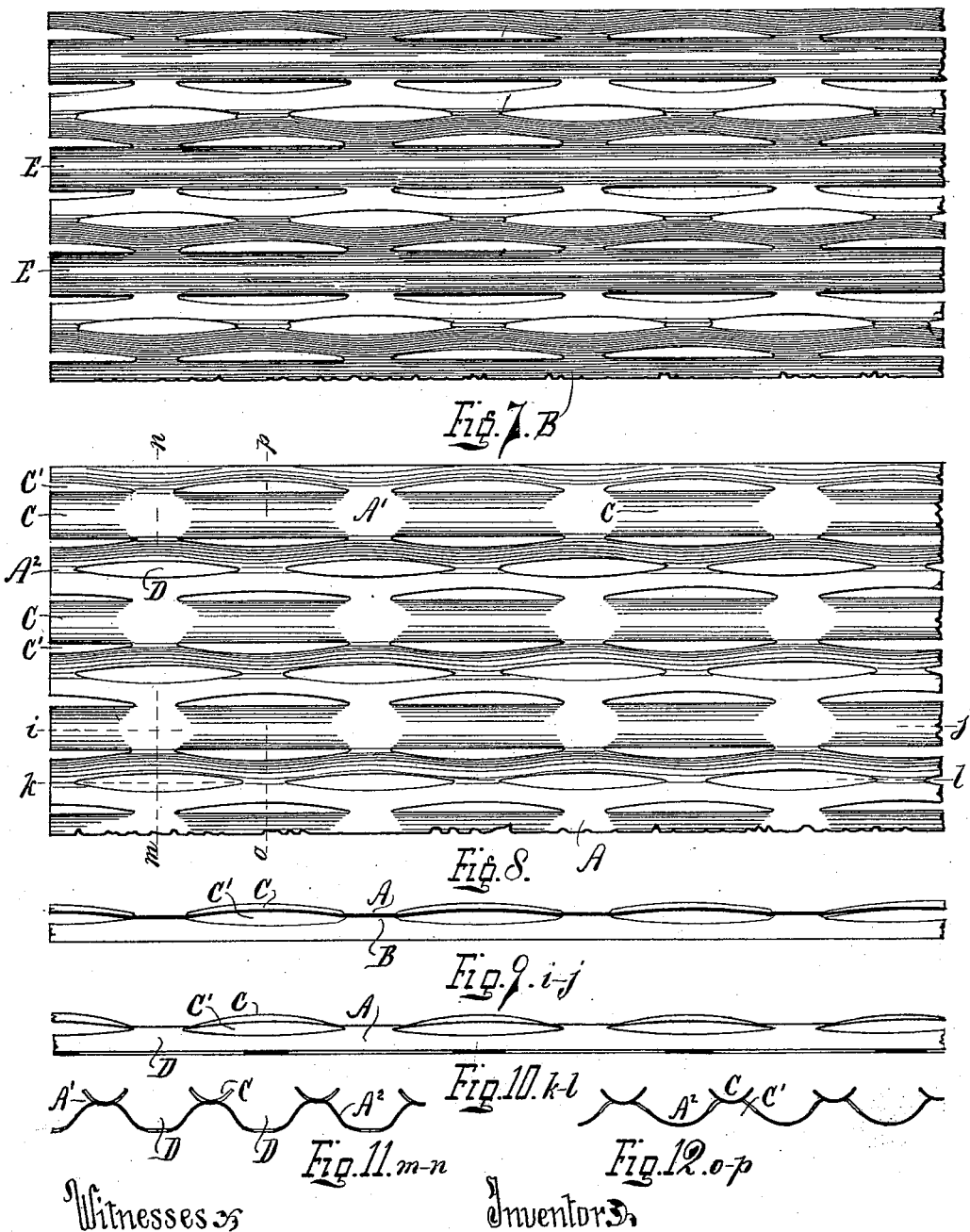

(Model.) 3 Sheets—Sheet 3.

G. HAYES.
METALLIC LATHING.

No. 521,498. Patented June 19, 1894.

Witnesses
Arthur Hayes
Frank Halle.

Inventor
Geo Hayes.

THE NATIONAL LITHOGRAPHING COMPANY,
WASHINGTON, D. C.

UNITED STATES PATENT OFFICE.

GEORGE HAYES, OF NEW YORK, N. Y.

METALLIC LATHING.

SPECIFICATION forming part of Letters Patent No. 521,498, dated June 19, 1894.

Application filed January 19, 1894. Serial No. 497,382. (Model.)

*To all whom it may concern:*

Be it known that I, GEORGE HAYES, a citizen of the United States, and a resident of the city, county, and State of New York, have invented a new and useful Metallic Lathing, of which the following is a specification.

My invention consists of a lathing of sheet-metal having to its main face, series of loops, between parallel slits at intervals, in rows, each loop having raised edges and concave intermediate face—also between every two rows of loops, a line of slitted apertures at intervals, "breaking joint" with the loops, the metal between each two rows of loops depressed out of plane and expanded.

It further consists of an expanded sheet-metal lathing, slitted at intervals in lines or rows—and formed into series of ridges and hollows—with along each ridge a series of loops having each a concave face and beneath the loops apertures at each side the ridge and in each hollow a line of apertures "breaking joint" with those beneath the loops.

It further consists of an apertured and expanded sheet-metal lathing formed into series of ridges and hollows with a longitudinal concave depression as a groove in the apex of each ridge.

It further consists of certain modifications of the above mentioned lathing sheets as are hereinafter more fully described and pointed out in the claims reference being had to the accompanying drawings, in which—

Figure 13:
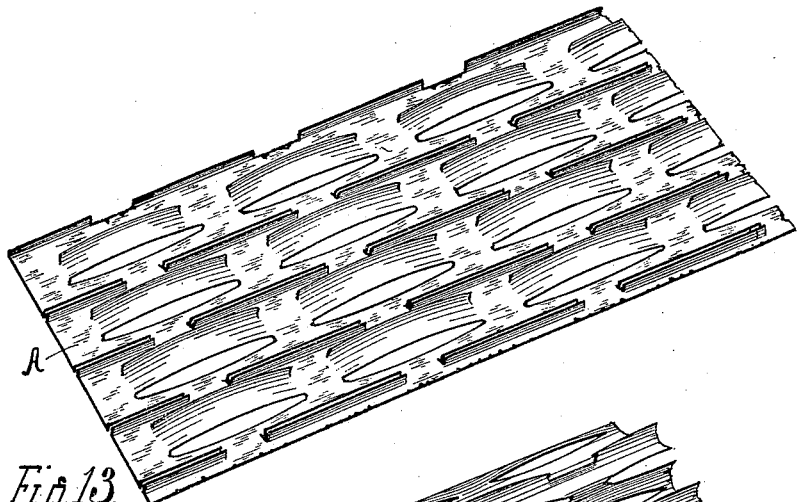
Figure 14:
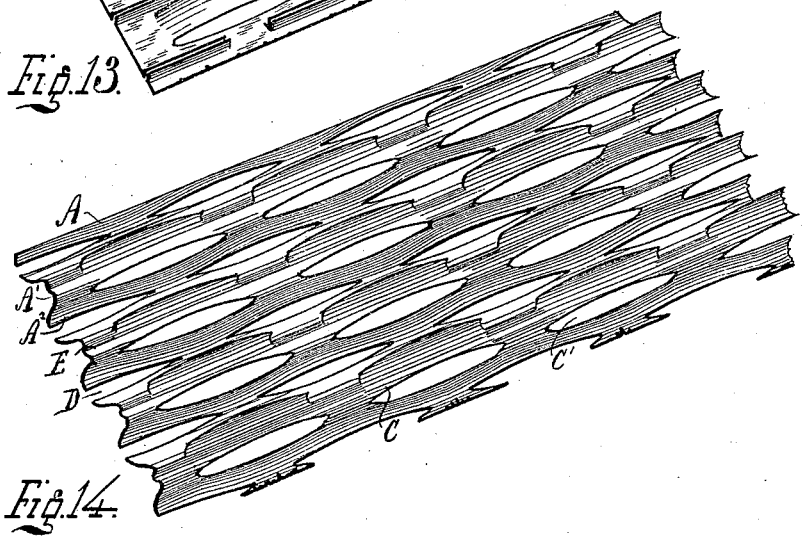

Figure 1, represents the one side of the sheet which receives the thrust in slitting, forming the back when completed. Fig. 2, represents the front face of the sheet, a reversal of Fig. 1. Fig. 3, is a longitudinal section on line $a$—$b$, of Fig. 2. Fig. 4, is a longitudinal section on line $c$—$d$, of Fig. 2. Fig. 5, is a transverse section on line $e$—$f$, of Fig. 2. Fig. 6, is a transverse section on line $g$—$h$, of Fig. 2. Figs. 1 to 6, inclusive illustrate the lathing sheet at the termination of the first stage. Fig. 7, is a face view of the back of the lathing sheet at the termination of the second stage of construction. Fig. 8, is a face view of the front of the same sheet of Fig. 7. Fig. 9, is a longitudinal section on line $i$—$j$, Fig. 8. Fig. 10, is a longitudinal section on line $k$—$l$, of Fig. 8. Fig. 11, is a transverse section on line $m$—$n$, of Fig. 8. Fig. 12, is a transverse section on line $o$—$p$, of Fig. 8. Figs. 7 to 12, inclusive illustrate the completed and superior form of the lathing herein claimed. Fig. 13, is a perspective view of the lathing sheet at completion showing first stage. Fig. 14, is a perspective view of the lathing at completion of second stage illustrating the same as when fully perfected.

On the drawings, A, indicates the front, or main face of the sheet and especially intended for the reception of, and covering of plaster when in use.

B, indicates the back of the sheet.

$A'$, indicates ridges and $A^2$, hollows as appear to the front face of the finished lathing sheet.

C, indicates loops located at intervals along the ridges—formed between slits $C'$ Figs. 1, 2, 7, and 8, which are opened or widened into apertures at the finish as in Figs. 7, 8, and 14, each side and beneath the edges of the loops in the slopes of the hollows. The loops C, are concave intermediate of their outer edges—the edges curving outward and the middle of the loops in line with the top of ridges centrally.

D, indicates slits. Figs. 1, 2, 7, 8, and 13, opened or widened into apertures at the finish as in Figs. 7, 8, and 13. In the finished lathing sheet these latter apertures come in the bottom of the hollows to main face and "break joint" with the apertures $C'$, of the slopes.

E, indicates a reverse bend in the metal, as a lesser hollow, along the apex line of each ridge, to the main face—the formation of which aids in the curving of the concave loops—add stiffness to the sheet—and keeps the longitudinal ridge line perfectly level from end to end of the sheet—serving to prevent curving in that direction. It may be dispensed with in some instances if desired but to obtain the best results and constitute a superior lathing it is essential.

I make this lathing in two stages—first slitting the sheet at intervals, when flat, to the condition shown in Figs. 1 to 6, inclusive and perspectively in Fig. 13, the act being performed by rotating dies, some of such edge and shape as to cut the slits $C'$, in pairs and curve the loops; and others edged to cut the intermediate slits D, breaking joint with the pairs, as in Figs. 1, 2 and 13. At this primal stage of construction the sheet so formed may be put to use as a lath serviceable in places where extreme rigidity is not a prerequisite—as it will hold plaster, or plastic compositions, sufficiently well to suit some requirements—it therefore is a modified, or lesser form of the greater lathing, and a part of the invention claimed herein.

After the first stage above described I bring the slitted sheet to the condition shown in Figs. 7 to 12, inclusive and perspectively in Fig. 14, by means of rotating formers, or dies—which are shaped so as to bind upon the sheet at certain points—notably as where intended to stand as ridges, and between such points press out of plane the intermediate metal intended to stand as the hollows to main face. Under the pressure aforesaid, all the slits open into apertures and the sheet remains at the configuration shown in Fig. 14, this latter formation being the superior and perfected condition of the lathing sheet, pre-eminently suited to all situations and requirements of the plasterer's art.

What I claim as new, and desire to secure by Letters Patent, is—

1. A corrugated slitted sheet of metal lathing as ridges and hollows, each hollow having through its bottom, apertures at intervals, and in the sloping sides of each hollow other apertures "breaking joint" with the apertures in the bottom, the apertures in the slopes arranged in pairs with a web of the ridge metal between each pair as a loop or bridge, with its outer edges raised and a concavity between, as set forth.

2. A corrugated slitted sheet of metal lathing having a series of loops along each ridge at intervals, each loop having upturned edges forming a concave, the extended surface of the sheet being allowed for by a lateral expansion of the slits in the depressions, as and for the purpose herein described.

3. A corrugated slitted sheet of metal lathing having regular and prescribed slits through the metal, arranged in three rows to each depression of the main face, the slits of the outermost lines having one edge of the border metal upturned, as and for the purpose herein described.

4. A sheet metal lathing having series of parallel slits as pairs in rows, the metal web between each pair raised as a loop with upturned edges and being concave between, apertured beneath, and between every two rows of loops so formed, a single line of slitted apertures "breaking joint" therewith, as set forth.

GEO. HAYES.

Witnesses:
GEO. A. HAYES,
FRANK. HALLE.